(12) United States Patent
Hall

(10) Patent No.: US 9,985,430 B2
(45) Date of Patent: May 29, 2018

(54) FAULT CURRENT LIMITER

(71) Applicant: Faultcurrent Limited, Cardiff (GB)

(72) Inventor: Jeremy Peter Hall, South Glamorgan (GB)

(73) Assignee: Faultcurrent Limited, Cardiff (GB)

( * ) Notice: Subject to any disclaimer, the term of this patent is extended or adjusted under 35 U.S.C. 154(b) by 277 days.

(21) Appl. No.: 14/770,956

(22) PCT Filed: Feb. 27, 2014

(86) PCT No.: PCT/GB2014/050587
§ 371 (c)(1),
(2) Date: Aug. 27, 2015

(87) PCT Pub. No.: WO2014/132067
PCT Pub. Date: Sep. 4, 2014

(65) Prior Publication Data
US 2016/0013634 A1    Jan. 14, 2016

(30) Foreign Application Priority Data
Feb. 28, 2013 (GB) .................................. 1303569.6

(51) Int. Cl.
H02H 9/02 (2006.01)
H01F 38/02 (2006.01)
H01F 3/10 (2006.01)

(52) U.S. Cl.
CPC ............. H02H 9/02 (2013.01); H01F 38/023 (2013.01); *H01F 2003/103* (2013.01); *H02H 9/021* (2013.01)

(58) Field of Classification Search
CPC ........ H02H 9/02; H02H 9/021; H01F 38/023; H01F 2003/103
See application file for complete search history.

(56) References Cited

U.S. PATENT DOCUMENTS 4,122,385 A * 10/1978 Oberbeck .............. H02H 9/021
                                                    323/362
4,152,637 A *  5/1979 Oberbeck .............. H02H 9/021
                                                    323/250
5,926,083 A *  7/1999 Asaoka .................... H01F 3/10
                                                    336/110
5,959,523 A *  9/1999 Westberg .............. H01F 27/245
                                                    336/216

(Continued)

FOREIGN PATENT DOCUMENTS

JP     2003284240 A    10/2003
JP     2005204457 A     7/2005

(Continued)

*Primary Examiner* — Scott Bauer
(74) *Attorney, Agent, or Firm* — Gordon & Jacobson, P.C.

(57) ABSTRACT

A fault current limiter (FCL) has a core structure with a first and second magnetisable core members and an AC magnetomotive force source configured to generate a varying magnetic flux in at least a portion of the first and second magnetisable core members. Static magnetomotive force sources being positioned to provide a magnetic circuit within at least part of the magnetisable core members. The FCL may have a ring core structure and the static magnetomotive force sources may include a mitered or tapered joint interface with the core member.

33 Claims, 10 Drawing Sheets

(56) References Cited

U.S. PATENT DOCUMENTS 6,885,272 B1 4/2005 Piaskowski et al.
2014/0301007 A1* 10/2014 Darmann ................ H01F 29/14
361/93.1

FOREIGN PATENT DOCUMENTS

| WO | WO2007/002924 A1 | 1/2007 |
| WO | WO2011/024179 A2 | 3/2011 |
| WO | WO2012/167330 A1 | 12/2012 |
| WO | WO2013/030571 A1 | 3/2013 |

* cited by examiner

FAULT CURRENT LIMITER

CROSS-REFERENCE TO RELATED APPLICATIONS

This application is the National Stage of International Patent Application No. PCT/GB2014/050587 filed on Feb. 27, 2014, which claims priority from British Patent Application No. GB 1303569.6 filed on Feb. 28, 2013, both of which are hereby incorporated by reference herein in their entireties.

BACKGROUND

1. Field

The present invention relates to a fault current limiter and in particular a fault current limiter having a re-settable static magnetomotive force source.

2. State of the Art

A Fault Current Limiter (FCL) is a device used to limit, or in its most basic form interrupt, a fault current in a branch of a circuit on occurrence of a fault condition so as to prevent any components in the circuit from being overloaded.

Fuses are an example of a device which interrupts high currents in fault conditions, however these devices must be replaced after a fault condition has occurred and cannot be used in high power systems. It is usually more preferable to employ a re-settable FCL which limits the fault current, rather than interrupts it.

An example of a re-settable FCL which is suitable for low power operations is the Magnetic Current Limiter (MCL) which comprises a permanent magnet sandwiched between a saturable core with an AC wire wound around the core (see FIG. 1). The permanent magnet 2 causes the core to saturate in the normal operating state. For the device to operate for each half of the AC cycle, two cores are required such that in the first core the magnetic field produced by the AC current flows through the coil since the magnetic field provided by the permanent magnet are additive and in the second core they are subtractive. In the normal operating condition the AC current flowing through the coil is low and both cores are saturated causing the effective impedance in the AC coil 3 to be low. During a fault condition a large AC current value (the fault current) forces each of the cores of the device to come out of saturation in alternative half-cycles. The mostly unsaturated first core in combination with the mostly saturated second core (and vice versa) restricts the flow of the fault current since the inductance of the coil is caused to increase. In this arrangement multiple distinct core elements are used and useful regions of the core, where interaction between the magnetic field associated with the magnet and the AC coil takes place, are limited. Further, the MCL does not perform well in high power alternating systems.

In higher power alternating power systems, series reactors have been implemented so as to protect against excessively large currents under short-circuit, however they have a major disadvantage in that they produce significant $I^2R$ losses.

Another system suitable for use in a high power alternating system is the saturated Iron Core FCL which comprises a copper coil with an iron core. The Iron core is maintained in magnetic saturation in normal operation by applying the magnetic field of an additional superconducting wire. The impedance of the device is low in normal operation; however when a fault condition occurs the increased AC current through the normal conducting coil causes the core to depart from saturation so as to cause the impedance of the device to increase. In this arrangement the superconducting wire is exposed only to DC current and therefore always remains in the superconducting state and eliminates the need for a recovery time. The main disadvantages with this system includes the large mass and volume of the device, the high magnetic fields at the superconducting coil and the high cooling costs of the superconducting coil.

A recently developed system for use in high power applications is the Superconducting FCL which relies on a rapid change of resistance with temperature so as to limit the fault current. The superconducting FCL is directly connected in series with the current path to be protected. When a specified current density is reached, which corresponds to a particular temperature, the resistance increases rapidly so as to substantially limit the flow of the fault current. Such arrangements have an array of disadvantages including: a) expensive cooling mechanisms since the superconductor must be cooled to 77K, b) the development of thermal instabilities and c) AC current cooling losses. Further, in order to prevent the excessive heating of the superconductor, so as to avoid long cool down phases, the reduced fault current is only be carried for a few cycles.

WO200702924 discloses a fault current limiter device in which an electromagnet DC source is utilised.

Due to the costs associated with the Saturated Iron Core FCL and the Superconducting FCL such systems are not usually desirable for smaller power operations e.g. circuits implementing power electronics devices such as transistors, diodes etc.

SUMMARY

It is therefore desirable to provide an improved Fault Current Limiter which addresses at least some of the above described problems and/or which offers improvements generally.

In a first aspect of the present invention there is provided fault current limiter (FCL) comprising:
 a core structure comprising:
  i) a first magnetisable core member;
  ii) a second magnetisable core member, spaced from the first core member;
  an AC magnetomotive force source configured to generate a varying magnetic flux in at least a portion of the first and second magnetisable core members; and;
  a plurality of static magnetomotive force sources being positioned to provide a magnetic circuit within at least part of the magnetisable core members.

In one embodiment it is preferred that the AC magnetomotive force source and the static magnetomotive forces source are relatively positioned to be orthogonal to each other.

In one realisation of the invention, a first core member is provided, and a second core member is provided, spaced from the first core member, the AC magnetomotive force source configured to generate a varying magnetic flux in both of the first and second core members.

It is preferred that in such a realisation, the first core member comprises a first closed magnetic circuit and the second core member comprises a second closed magnetic circuit distinct from the first closed magnetic circuit.

This has an effect that during a fault current event, flux linkage is completed predominantly through the AC coils, through the cores, and magnetomotive force source (e.g permanent magnet(s)), not through the air outside the AC solenoid which is the case in some prior art systems.

Effectively, this provides a closed magnetic structure for the AC circuit. The AC component of the field is encouraged to flow around the closed circuit.

The first and/or second magnetic circuit may be comprised of core members (for example segmented core members) spaced by air gaps. This has the benefit that the magnetic flux is inhibited from short circuiting in the soft magnetic cores. An air gap may also be inserted in the circumferential path of the soft magnetic cores so as to increase the reluctance to the AC flux of the soft magnetic core with minimal effect on the DC path reluctance. This extends the upper range of the FCL before very large AC fields from driving the core back to saturation.

It is preferred that the static magnetomotive force source is positioned to provide magnetic saturation in both of the magnetic circuits.

It is preferred that the static magnetomotive force source is positioned to bridge the gap between the first and second core members.

Beneficially, the static magnetomotive force source is positioned to provide a bifurcated magnetic field in the core adjacent to the static magnetomotive force source in which the field direction in the same core member branches in opposed directions at the junction with the static magnetomotive force source. This bifurcation of the static magnetic field at the junction with the core members, particularly where permanent magnets are used to bridge the gap between core members, provides protection against de-magnetisation of the static magnetomotive force source, during a fault current event. The arrangement provides common mode rejection of the AC field across the poles of the static magnetomotive force source.

In a preferred realisation, the FCL comprises a plurality of stacked or filed adjacent core structures each comprising a ring structure, the plurality being positioned stacked or in file one adjacent another and each comprising:
  a core structure comprising:
  i) a first magnetisable core member; and
  ii) a second magnetisable core member, spaced from the first core member.

In a first embodiment of such a stacked or filed arrangement, the AC windings are wound around the entire stack or file of adjacent ring core structures.

In an alternative embodiment of such a stacked or filed arrangement, the AC windings are wound around the first and second core members in adjacent core structures, only.

In a preferred arrangement, the core structure comprises a ring structure in the form of a polygonal shaped ring.

It is preferred that the core structure comprises a ring structure in the form of a polygonal shaped ring having 6 or more sides, more a polygonal shaped ring having 8 or more sides.

Beneficially, static mmf sources are positioned at corners/vertices of the core structure.

The static mmf sources (e.g. permanent magnets) preferably have a body, which includes limbs extending in different directions, preferably following the shape of the adjacent core member.

In certain embodiments, it may be preferred that the core structure comprises a ring structure in the form of a polygonal shaped ring wherein static mmf sources are positioned at corners/vertices of the core structure and wherein the static mmf sources have a body, which body includes limbs extending at inclined angles corresponding to the angle between the connected sides of the polygon.

In certain embodiments, it may be preferred that the static mmf sources comprise a respective body which extends adjacent the core member for a distance greater than an air gap spacing adjacent static mmf source bodies.

In certain embodiments, it may be preferred that the static mmf sources comprise a respective body which includes a mitred or tapered jointing surface formation forming a mitred or tapered joint with a complimentarily mitred or tapered jointing surface of the core member. Such tapered or mitred joints ensure an increased and more uniform magnetic field saturation at the transition from the static mmf source into the core members. The saturation of the core members is improved by utilising tapered or mitred joints between the core members and the mmf sources.

Alternatively or additionally, the static mmf sources may comprise a respective body which includes a stepped jointing surface forming a joint with a complimentarily recessed jointing surface of the core member. Similarly such stepped joints ensure an increased and more uniform magnetic field saturation at the transition from the static mmf source into the core members. The saturation of the core members is improved by utilising stepped joints between the core members and the mmf sources.

Preferably the AC magnetomotive force source is an AC coil having a longitudinal axis and to which is applied an AC current so as to produce an AC magnetic field and the static magnetomotive force source is a magnet having a magnetic dipole moment associated with it.

Preferably the AC coil and the at least one magnet are relatively positioned such that the longitudinal axis of the coil is orthogonal to the magnetic dipole moment of the magnet. This beneficially protects the permanent magnets and aids saturation of the core material since the DC/static magnetomotive force can be more easily distributed without increasing the AC reluctance of the core material (since the relative permeability of the permanent magnetic material is low and is seen by the AC magnetomotive force as a high reluctance element in the magnetic circuit).

Preferably the arrangement of the at least one magnet causes at least part of the at least one core member to become saturated in normal operation wherein in a fault condition the magnitude of the AC magnetic field increases from a normal state value to overcome saturation in at least part of the at least one core member so that the AC coil obtains a higher inductance when a fault condition occurs so as to prevent the passage of the fault current through the coil.

Beneficially the at least one magnet is formed from a permanent magnetic material so as to provide a static magnetic (DC) field. The use of permanent magnets can be extremely beneficial in that there is no requirement to use superconducting systems or electromagnets that require significant power supply. The concern with the use of permanent magnets is their potential de-magnetisation during a fault current event and the result that the FCL would thereafter not re-set to a usable state. This concern is ameliorated by the way in which the permanent magnets are incorporated into the magnetic circuit of the device.

During a fault event the flux due to the mmf of the AC coil adds to and subtracts from the alternate sections or segments of the core members. Flux linkage is largely completed through the permanent magnets in the direction of pre-magnetised moment of the magnets. This flux linkage through the permanent magnet provides protection against demagnetisation. The permanent magnets being in closed magnetic circuit provides protection against demagnetisation.

The limit of the fault current limiter will be when the flux due to the mmf of the AC coil drives all segments of the cores beyond saturation.

It is preferred that the static magnetomotive force source is positioned to bridge the gap between the first and second core members.

A benefit of the having magnets bridging the gap is that DC mmf can be distributed around the magnetic circuit without introducing a break the circuit of the cores. Further, since the magnetomotive force from the permanent magnet is more limited than for example a superconducting source, the magnetomotive force source may be augmented by distributing a number of pairs of magnets, again with no break in the magnetic circuit.

It is preferred that at least two static magnetomotive force sources are provided, preferably comprising permanent magnets and positioned to bridge the gap between first and second core members. It is preferred that one or more pairs of magnetomotive force sources are provided, preferably comprising permanent magnets and positioned to bridge the gap between first and second core members.

The benefit of such an arrangement is that a low reluctance DC flux path is provided to aid saturation and protection of the magnets, whilst at the same time allowing high levels of flux linkage through the magnetic circuit to give good current limiting inductance during a fault. The ability to include magnets distributed in this way provides distributed DC mmf around the magnetic circuit, aiding core saturation.

Beneficially the at least one magnetisable core member responds equally to the positive and negative halves of the AC current cycle received by the AC coil such that separate and distinct core devices for dealing with each half of the AC cycle (as in FIG. 1) are not required.

Preferably the permanent magnetic material of the at least one permanent magnet recovers its original magnetised state on cessation of a fault current event so as to automatically reset in preparation for the detection of the next fault current event.

Preferably the magnetisable core contains at least one air gap so as to space apart the permanent magnets so as to prevent the magnetic flux from short circuiting between the magnets which has the effect of reducing the flux in the soft magnetic cores. An air gap may also be inserted in the circumferential path of the soft magnetic cores so as to increase the reluctance to the AC flux of the soft magnetic core with minimal effect on the DC path reluctance. This avoids very large AC fields from driving the core back to saturation. In this arrangement it is preferable for the at least one air gap in the magnetisable core to be positioned above and below the surface of the pole faces of the at least one permanent magnet at the region of bifurcation so as to enhance the performance of the device by extending the working fault current limiting range. In an alternative embodiment the at least one magnet is intersected by an air gap so as not to increase the reluctance of the DC flux path, thereby aiding saturation of the soft magnetic cores in the regions between the magnets and also permitting the cores to be constructed in sections so as to aid the manufacturing process.

Beneficially the AC coil is wound around the region of the magnetisable core where the overcoming of saturation is to be achieved. This reduces the effect of the AC flux on the permanent magnets at high AC currents.

Beneficially parallel AC coils may be wound around each of the magnetisable cores in the region where the overcoming of saturation is to be achieved. The area of the coil and hence the inductance at low normal current is minimised in this arrangement.

Preferably the FCL can be used for single phase applications or for three-phase applications.

Preferably the at least one magnetisable core member is formed of strip steel or other ferromagnetic metal alloy, a soft ferrite material or an amorphous or nanocrystalline soft magnetic alloy. These materials provide the desired saturation capability and can be driven from saturation in the event of a fault condition.

Beneficially a circuit or an alternating power system can include the fault current limiter of the invention.

Beneficially the at least one magnetisable core member is formed of strip steel or other ferromagnetic metal alloy, a soft ferrite material or an amorphous or nanocrystalline soft magnetic alloy.

Preferably the arrangement of the at least two magnets causes at least part of the at least one core member to become saturated in normal operation, wherein in a fault condition the magnitude of the AC magnetic field increases from a normal state value to overcome saturation in at least part of the at least one core member such that the AC conductor obtains a higher inductance when a fault condition occurs.

Beneficially the at least one magnetisable core member responds equally to the positive and negative halves of the AC current cycle received by the AC conducting element.

Preferably the permanent magnets recover their original magnetised state on cessation of a fault current event.

The second aspect of the invention can be used for single phase or for multi-phase applications.

The broadest aspect of the invention can be characterised by one or more preferred features of the aspects described above or by technical features described in relation to the specific embodiments which follow.

The present invention will now be described by way of example with reference to the following illustrative.

DETAILED DESCRIPTION

Figure 1:
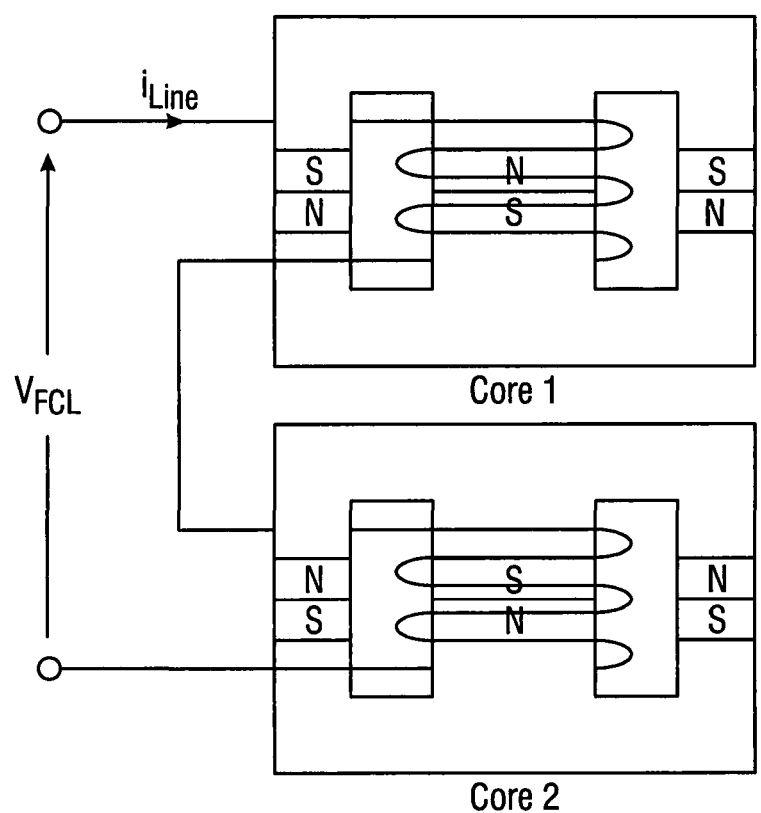
FIG. 1 shows a side view of a Magnetic Current Limiter in accordance with the prior art.
Figure 2A:
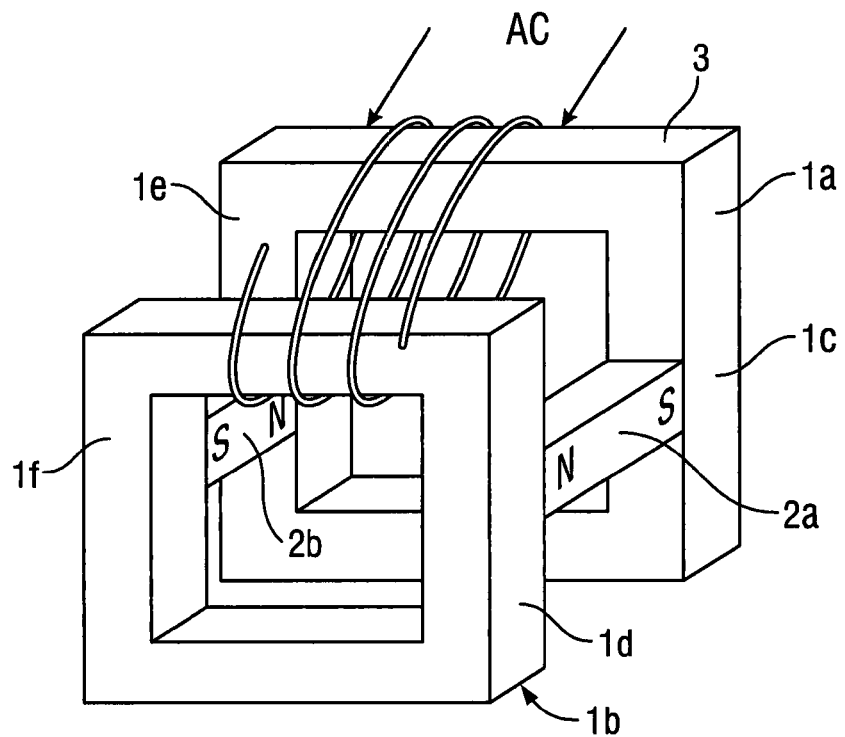
FIG. 2A shows a perspective view of a FCL in accordance with a first embodiment of the present invention and FIG. 2b shows a detail of FIG. 1 explaining bifurcation of the field.
Figure 2B:
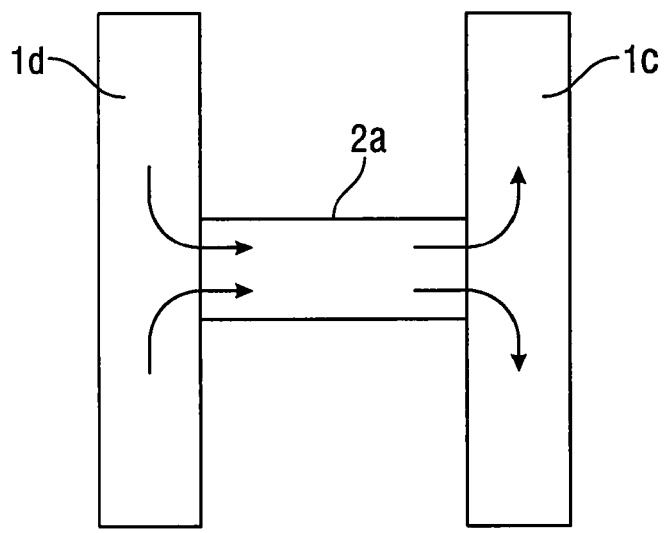

FIG. 2 shows a magnetisable core 1 formed of two core sections 1a, 1b. The first core section 1a has a picture frame shape and the second core section 1b is a mirror image of the first core section. The first and second sections 1a, 1b are arranged in a face-to-face parallel arrangement, the first core section comprises a first closed magnetic circuit and the second core section comprises a second closed magnetic circuit distinct from the first closed magnetic circuit. A first DC magnetomotive force source 2a, for example a magnet, such as a magnet made from permanently magnetic material (hereafter referred to as a permanent magnet) is arranged to bridge the gap between between the two opposing faces of the first and second core sections 1a, 1b, so as to link a first arm 1c of the first core section with a first arm 1d of the second core section. The permanent magnet 2a is also known as a static magnetomotive force source and has a magnetic dipole moment associated with it. It is an advantage of the arrangement of the invention that for the FCL, re-coil of the permanent magnet is not a primary concern since the flux linkage through the magnet during fault helps to maintain the moments of magnets. It is of concern in the case of the prior art shown in FIG. 1 where the moment of the magnets face full force of the AC mmf head on. This is required so that the Fault Current Limiter can automatically reset following a fault current event thereby ensuring that the permanent magnet is not permanently demagnetised. In this embodiment the permanent magnet is one which possesses good re-coil capability such as a rare earth metallic alloy or a hard ferrite. A second permanent magnet 2b possessing a good re-coil capability and having a magnetic dipole moment opposing the direction of the magnetic dipole moment of the first magnet 2a is arranged between the two opposing faces so as to link a second arm of the first core section 1e and a second arm of the second core section 1f.

The first and second permanent magnets 2a, 2b are in a parallel arrangement and the first and second arms 1c, 1d, 1e, 1f are parallel arms in the frame arrangement. The flux set up by the first and second permanent magnets 2a, 2b forms a complete magnetic circuit through the soft magnetic material of the core 1 i.e. a magnetic field flows from the north pole of the first magnet 2a through the first core section 1a to the south pole of the second magnet 2b and the north pole of the second magnet 2b flows through the second core section 1b to the south pole of the first magnet 2a. Therefore the magnetic field flows in opposite directions in the first and second core sections 1a, 1b. The relative geometries of the core sections 1a, 1b and the permanent magnets 2a, 2b are so as to maximise the ratio of magnetic flux interacting to non-interacting volume of the core. Therefore, ideally under normal operating conditions the entire volume of the soft magnetic material of the core 1 remains in the magnetic saturated state.

An AC magnetomotive force source 3, or AC conductive element is wound around a perpendicular arm of the first and second core 1a, 1b in a parallel arrangement so as to provide an AC coil. The AC magnetomotive force source 3 and the static magnetomotive force source 2a,2b are relatively positioned to be orthogonal to each other. Therefore the longitudinal axis of the AC coil is orthogonal (or perpendicular) to the dipole moment of the magnet i.e. the north to south direction of the magnet. Alternatively this can be thought of as the coil being arranged to provide an orthogonal AC field to the DC field generated in the region of the core close to the pole face of the DC magnetomotive force source (e.g. permanent magnet). The important interaction between the AC and DC fields is where there is a parallel interaction between the AC and DC fields within the soft magnetic cores.

Under normal operating conditions the AC current which passes along the AC coil experiences minimal impedance. As current passes along the AC coil a magnetic field in a direction perpendicular to the magnetic moment of the first and second permanent magnet is produced. As mentioned above this may also be defined with respect to the pole face whereby the AC field in the region near to the pole face of the permanent magnet is perpendicular to the DC magnetic field generated by the magnet at the pole face and in the region close to the pole face.

The inductance L of the coil 3 can be approximated with the following equation:

$$L = \mu_0 \cdot \mu_r \cdot N^2 \cdot A / l,$$

where $\mu_0$—permeability of free space (constant), $\mu_r$—relative permeability of the magnetic core 1, N—number of turns of the coil 3, A—cross section area of the coil 3, l—magnetic path length of the coil 3. The N, A and l are linked with the physical design of the coil 3 (inductor) thereby making it relatively difficult to change them gradually over a wide range. The permeability of free space $\mu_0$ is a constant. The relative permeability $\mu_r$ is a measure of how easy the material of the core 1 can be magnetised and it is usually measured for closed magnetic circuits. The $\mu_r$ varies with many factors, the most important being the level of magnetisation and for a ferromagnet material this can vary from tens of thousands (at the peak) to one (at extremely high magnetisation).

Therefore, in normal operation the inductance of the AC coil 3 is low since the core (comprising of the first and second core sections 1a, 1b) is saturated by the presence of the magnetic circuit within the core caused by the magnet arrangement. When a fault condition occurs a high current (a fault current) flows through the AC coil 3 and the magnetic field generated by the AC coil 3 increases in magnitude and becomes strong enough to overcome the magnetic saturation in regions of the core where the AC field and permanent magnetic field interact in opposite directions, i.e. where the fields are subtractive.

For example firstly considering the effect in the first section of the core 1a. When considering the positive half cycle of the AC signal, the magnetic field produced by the AC coil 3 is subtracted from the magnetic field produced by the permanent magnet 2a in the regions where the two fields oppose causing at least part of the region in the first core section to become unsaturated. However, when considering the region of the first core section 1a where the fields are in the same direction the core in this region is driven deeper into saturation, there is no change in the relative permeability $\mu_r$ in this region. Therefore the combined net effect provides a net increase in relative permeability $\mu_r$ which, in accordance with equation 1, provides an increase in the AC coil inductance value. This increase in inductance limits the passage of the fault current through the coil 3.

The second core section 1b functions in the same way, however the saturated and unsaturated portions are reversed compared to that of the first core section 1a. This results from the permanent magnetic fields in the second core section 1b being in opposing directions to those in the first core section 1a.

When considering the effect of the negative half of the AC cycle on the first core section 1a, the first core section now behaves in the same way as the second core section 1b does for the positive half cycle i.e. the regions where the AC magnetic field and the permanent magnetic field coincided previously are now experiencing opposing fields, therefore the two fields subtract to give an unsaturated (or less saturated) region, and the regions which were opposing now coincide (adding to give a more saturated region). The inversion is also applied to the second core element 1b. It is noted that the cyclic nature of the AC current passed through the coil 3 causes the direction of the AC magnetic field to vary (or alternate) whereas the magnetic fields caused by the permanent magnets are fixed in direction, therefore they are said to be DC fields or static fields.

Therefore for both halves of the AC cycle (i.e. the positive and negative parts), the overall effect of the magnetic fault current limiter is an increase in inductance of the AC coil 3 due to an increase in $\mu_r$ of the core (in accordance with equation 1) as a fault current passes through the AC coil 3. Therefore the passage of the fault current can be limited for each half of the AC current cycle.

The use of permanent magnets for the magnetomotive source elements 2a 2b can be extremely beneficial in that there is no requirement to use superconducting systems or electromagnets that require significant power supply. The concern with the use of permanent magnets is their potential de-magnetisation during a fault current event and the result that the FCL would thereafter not re-set to a usable state. This concern is ameliorated by the way in which the permanent magnets are incorporated into the magnetic circuit of the device. Although the permanent magnets 2a, 2b may experience brief periods of demagnetisation, they are not easily permanently demagnetised and 'spring back' or 're-coil' into the original (or default) magnetised state following a fault current event.

The static magnetomotive force sources (permanent magnets 2a, 2b) are positioned to provide a bifurcated magnetic field in the core 1a, 1b in which the field direction in the same core member branches in opposed directions at the junction with the static magnetomotive force source (permanent magnets 2a, 2b). This is shown most clearly in FIG. 2A. This bifurcation of the static magnetic field at the junction with the core members, particularly where permanent magnets are used to bridge the gap between core members, provides protection against de-magnetisation of the static magnetomotive force source, during a fault current event. The arrangement provides common mode rejection of the AC field across the poles of the static magnetomotive force source. Such an arrangement is not disclosed in, for example WO2007029224.

The use of one or more pairs of permanent magnetomotive force sources to bridge the gap between core members provided benefits also in that a low reluctance DC flux path is provided to aid saturation and protection of the magnets, whilst at the same time allowing high levels of flux linkage through the magnetic circuit to give good current limiting inductance during a fault. The ability to include magnets distributed in this way provides distributed DC mmf around the magnetic circuit, aiding core saturation.

The implementation of shielding 4a, 4b, for example copper shims or plates (shown in FIGS. 13 and 14) arranged around the electrically conductive permanent magnet 2 prevents eddy current heating in the permanent magnet 2 by reducing the direct action of the AC field on the permanent magnet 2 which also helps to prevent or minimise permanent demagnetisation. The eddy current effect is represented by the arrow within the shielding in FIG. 14.

Figure 3:
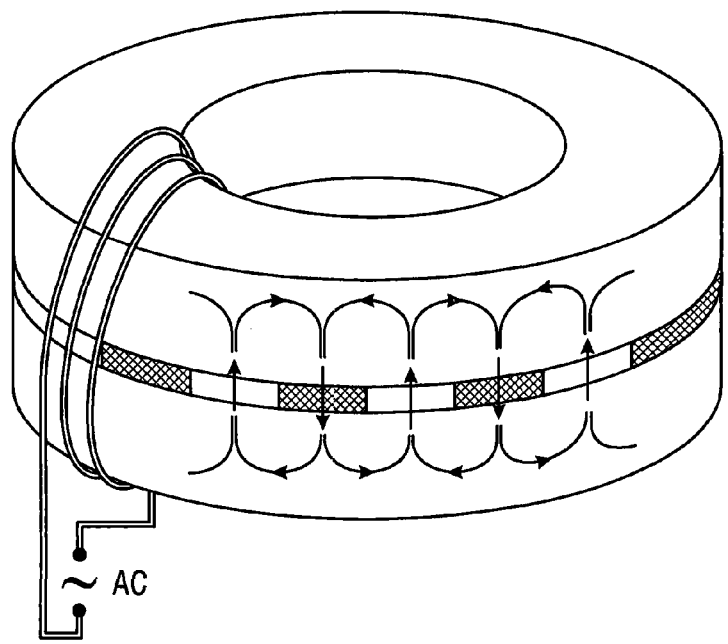
FIG. 3 shows a perspective view of a FCL in accordance with a second embodiment of the present invention.

FIG. 3 shows a core consisting of a series of permanent magnets 2 arranged in the form of a ring and sandwiched between two soft magnetic ring cores 1a, 1b. The ring could be non-circular, such as an oval or geometric shape such as a hexagon or an octagon. The magnets are distributed about substantially the entire ring. The side edges of the permanent magnets are in contact with the side edge of its neighbour permanent magnet and the magnetic moments (indicated by the bold arrow) of adjacent magnets are in opposite directions.

A coil 3 is wound around the whole core 1 which includes 1a and 1b such that the direction of AC flux is along the circumferential direction of the core 1 and orthogonal to the moments of the permanent magnets 2. The flux set up by adjacent permanent magnets 2 forms a complete magnetic circuit through the soft material of the core 1 above and below the ring of magnets 2. The relative geometries of the permanent magnets 2 and core members 1a, 1b (in this instance the core members are rings of soft core material) are such that the entire core 1 is saturated under normal operating conditions by the magnetic circuit provided by the magnet arrangement, so as to keep the inductance of the coil 3 at a minimal value. Under fault conditions the saturation is overcome in regions of the core 1 so as to give the core 1 a higher net relative permeability so as to increase the inductance of the AC coil 3.

For example, in the event of a fault condition the regions in the core where the DC/static magnetic field generated by the permanent magnet coincides with the AC magnetic field, the two fields are additive, thereby causing the core in these regions to saturate even deeper. However, in the regions where the DC/static magnetic field and the AC magnetic field oppose (i.e. flow in opposite directions) the AC field is subtracted from the permanent magnetic field and the core in these regions becomes less saturated and may even become unsaturated when the magnitude of the AC fault current is high. The net permeability of the core 1 is therefore increased causing the inductance of the coil 3 to also increase so as to prevent and/or limit the passage of fault currents through the AC coil 3. Since the AC signal is cyclic (having positive and negative half cycles) the AC magnetic field is caused to vary its direction depending on the half cycle and the direction of the magnetic field varies (or alternates) between opposing circumferential directions. Therefore, the regions of the core where the DC/static and AC magnetic fields were previously additive are now subtractive and vice versa. The symmetry of the system, therefore enables the core to provide the current limitation for either half of the AC current cycle and eliminates the need for two separate devices each dealing with only one half of the cycle (as is the case in FIG. 1).

Figure 4A:
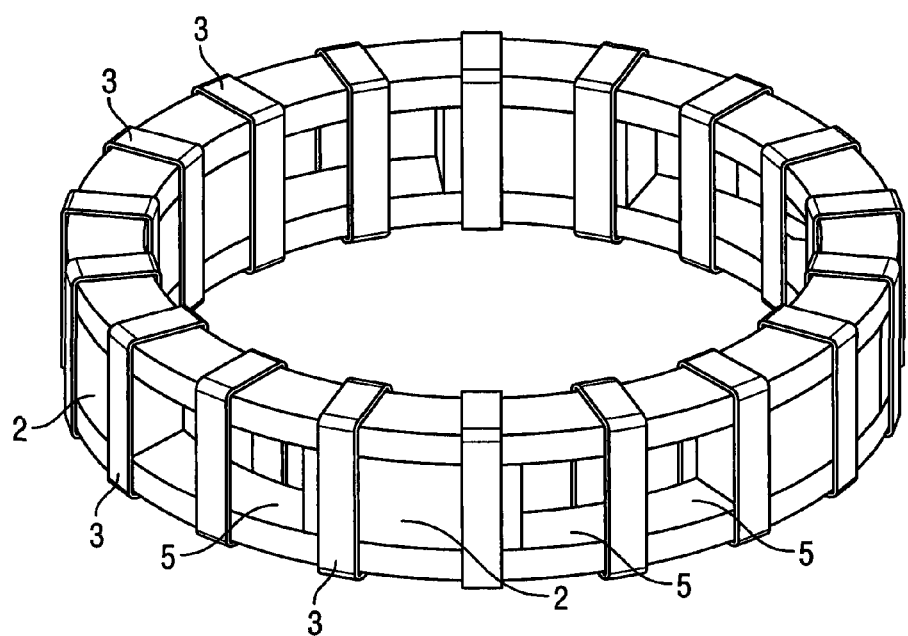
FIG. 4A shows a perspective view of a FCL in accordance with a third embodiment of the present invention including a ring core structure.

FIG. 4A shows air gaps 5 arranged between the series of rare-earth magnets 2 of FIG. 3. Air has a permeability of several orders of magnitude lower than the permeability of ferromagnets and ferrimagnets used for the magnetic cores.

The device operates in the same way as the device in FIG. 3, however the inclusion of the air gaps 5 prevents the magnetic flux from short circuiting. The Permanent Magnetic FCL (PMFCL) of FIG. 4A was modelled using a 3D non-linear transient simulation solver so as to simulate the transient effect of the PMFCL. The parameters of the model were as follows:

Firstly considering the core:
Inner diameter—200 mm
Outer diameter—280 mm
Height—15 mm
Material type—Soft Magnetic silicon steel M4
Next considering the Permanent Magnet:
No. of poles: 6 equally spaced
Inner diameter: 200 mm
Outer diameter: 280 mm
Height: 30 mm
Material type Neodynium Iron Boron: 34/22
Electric resistivity: 1.5e-006 Ωm
Finally considering the AC coil:
Number of turns: 20 turns
Total number of turns in the whole coil: 50
Material type: copper The PMFCL modelled is shown in FIG. 4A. The PMFCL is coupled to an electric circuit in which a defined sinusoidal voltage source is connected to the PMFCL and load. The circuit is shown in FIG. 5a. The current in the circuit is calculated by software according to the circuit parameters. To simulate the short circuit effect, a switch 6 is connected in parallel across the load 7. The model is solved when the switch 6 is open and the current in the circuit is calculated at each time step. At a defined instant the switch 6 is closed leading to a short circuit of the load so as to simulate the fault condition. The transient current is determined according to the permanent magnet fault current limiter parameters. The width of the soft steel core 1 of FIG. 4 has been selected to be 15 mm so as to achieve full saturation throughout the volume of the core material.

Figure 5A:
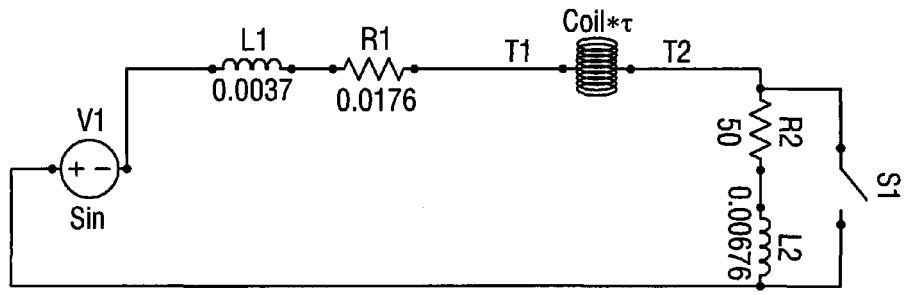
FIG. 5a shows the electric circuit used in the simulations and 5b shows the results of the simulation of the FCL arrangement of FIG. 4A.
Figure 5B:
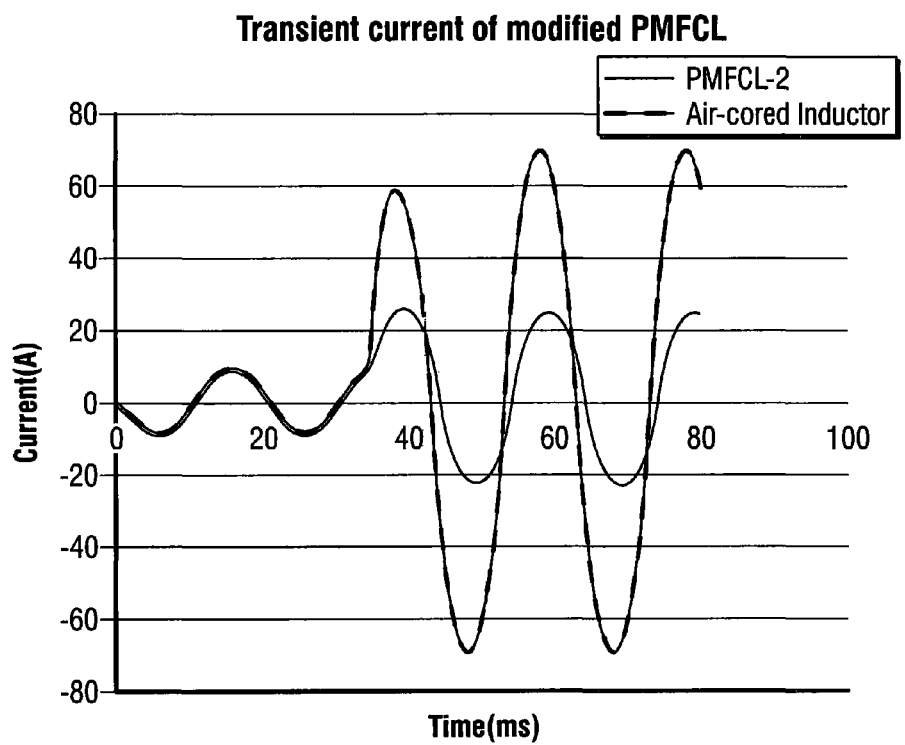

FIG. 5b shows a 3D, non-linear, time-step solution for the model of FIG. 4A. The current was calculated at each time step prior to and after closing the switch. The graph displays transient current against time for the PMFCL and an air cored inductor (which is used as a comparison model). The results show a clear attenuation of the circuit current due to the presence of the PMFCL when compared to the air-cored inductor, whereby the maximum peak is in the region of 25 A compared to 70 A.

Figure 4B:
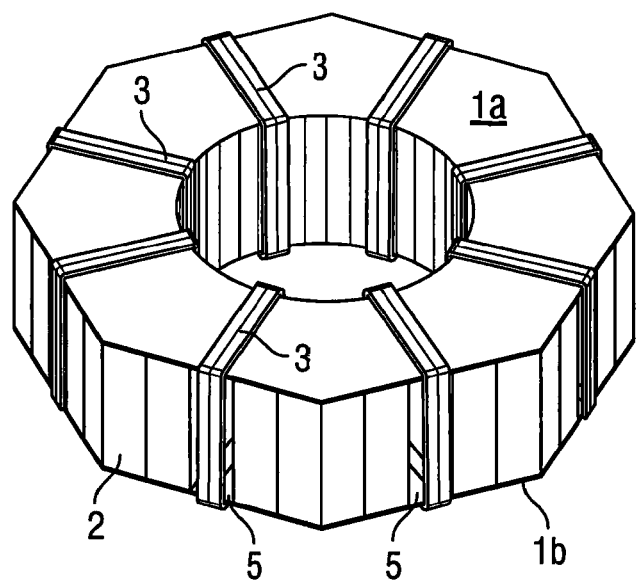
FIG. 4B shows an embodiment similar to the embodiment of FIG. 4A but as a polygonal ring core structure.

FIG. 4B shows a variation on the theme of FIG. 4A in which the core ring is of a non-circular geometric shape (in this instance being octagonal) and formed of soft iron core members 1a 1b. Sandwiched between the core members 1a 1b are the permanent magnets 2, which extend around the corners of the geometric shape, (i.e. the octagon corners/vertices) and are greater in extent around the ring than the intermediate air gaps 5. It has been identified that small angle corners/vertices in polygonal (or toroidal) ring cores 1a 1b are beneficial technically when compared with right angle corners as shown for example in FIG. 2. In the regions above the pole faces of the magnets 2, bifurcation of the flux results in some of the iron core member 1a 1b remaining unsaturated. It has been found that the area remaining below saturation is less in a core with corners of 45 degrees than in a core with 90 degree corners such as shown in FIG. 2. Accordingly a polygonal closed ring core (such as shown in FIG. 4B) contains at least 3 pairs of magnets and 6 straight sides, with corner angles of 60 degrees or less. The preferred design as shown in FIG. 4B includes 4 pairs of magnets and 8 sides (i.e. is octagonal in shape).

As mentioned above, sandwiched between the core members 1a 1b are the permanent magnets 2, which extend around the corners of the polygonal geometric shape. The magnets 2 extend around the ring circumference and therefore have a projected pole face which is L or V shaped having limbs extending in directions inclined at an angle with respect to one another, the angle between the limbs of the pole face will depend upon the polygonal shape of the core. Such a projected pole face which is V shaped having limbs 27 28 extending in directions inclined at an angle with respect to one another is shown in FIG. 4D.

Figure 4C:
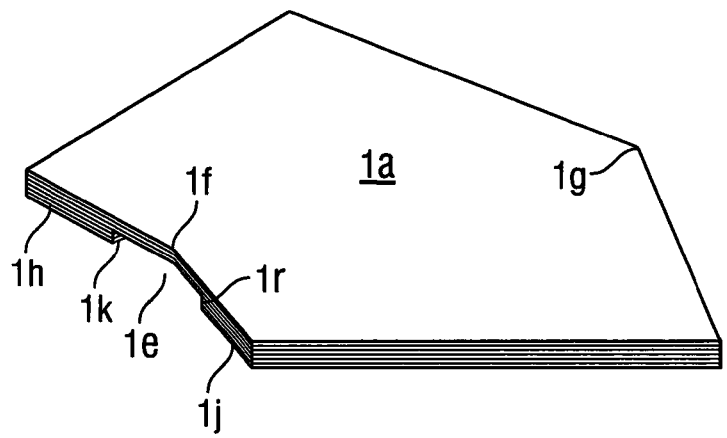
FIG. 4C shows a detail of the core member 1a including the recess for receiving the stepped tongue of the pole of the magnet.
Figure 4D:
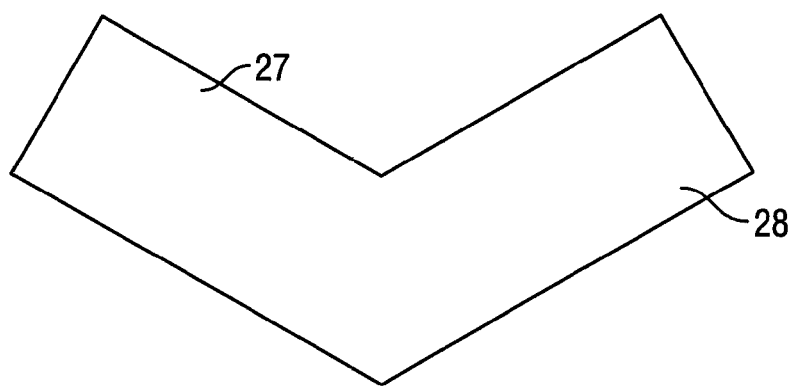
FIG. 4D shows a plan view of a magnet having differently orientated limbs for use with a polygonal core.
Figure 7:
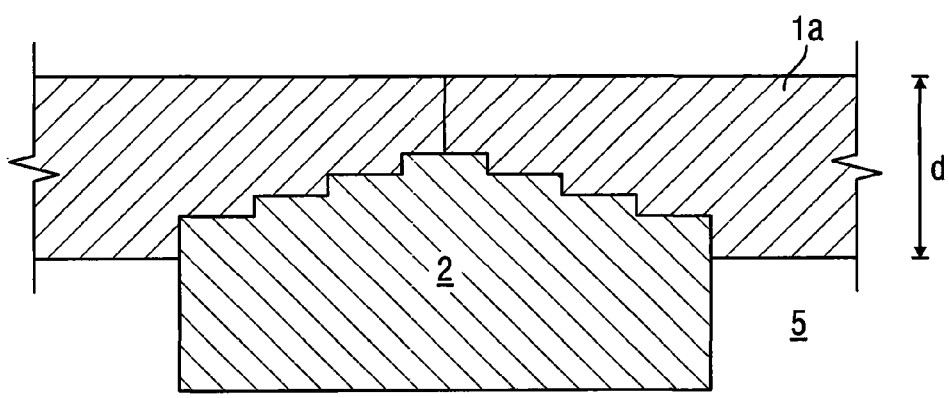
FIG. 7 shows a detail view of a FCL having a stepped joint connection between core member and magnet.

Also, as shown in FIG. 4C at the corners of the geometric shape, the magnets 2 and core members 1a, 1b, are formed, complimentarily, to have stepped joint portions. For example in FIG. 4C the core member 1a includes a recess or groove 1e on its lower surface which extends from the inner corner vertex 1f to the outer corner vertex 1g. The upper surface of the magnet 2 is provided with a complimentarily shaped proud standing tongue (not shown) such the upper surface of the magnet 2 engages with the stepped surface of the core member 1b both to the sides 1h 1j of the groove 1e and within the groove itself. Importantly there is contact of the core member groove side walls 1k with the tongue sides of the core member. This arrangement is mirrored on the contact arrangement provided for the magnets 2 with the lower core member 1b. The stepped arrangement increases the saturation of the iron cores 1a 1b between the magnets and above the pole faces. In FIG. 7 which is a variation on the arrangement of FIG. 4C the step formations takes the form of a series of complementary recesses and tongues forming multiple successive steps. The arrangement ensures contact between the magnet and the core 1b over a greater range of the thickness (depth d) of the core member 1b and this is what improves the saturation of the iron cores 1a 1b.

Figure 8A:
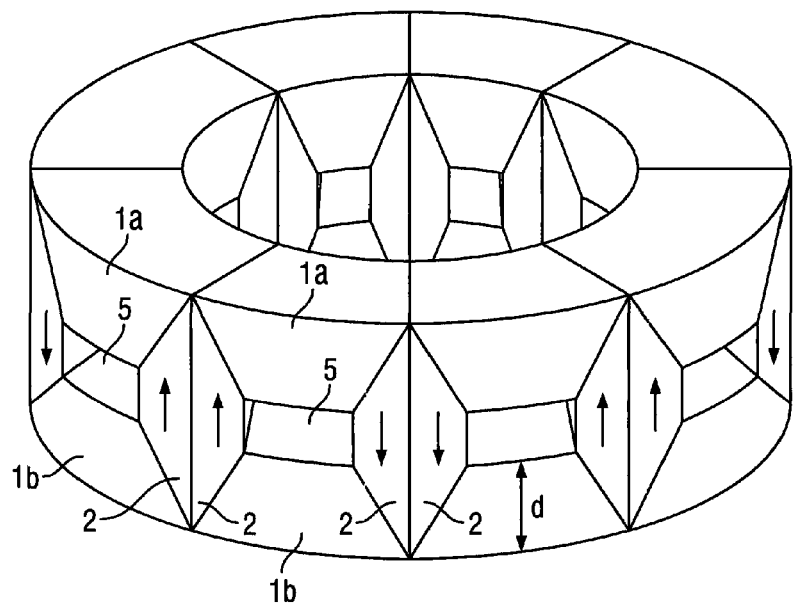
FIG. 8A shows a perspective view of a FCL in accordance with an embodiment of FCL having a tapered/mitred joint connection between core member and magnet.

Taking this to an alternative and greater degree, the embodiment of FIG. 8A shows the joint interface between the magnet 2 and the core members 1a, 1b as being a tapered/mitred joint, which can extend up to the entire depth d of the core member 1a, 1b. In the embodiment shown air gaps 5 are present in the core between the magnets 2. The interface angle of the mitred/tapered joint can be tailored to provide for optimum performance.

Figure 8B:
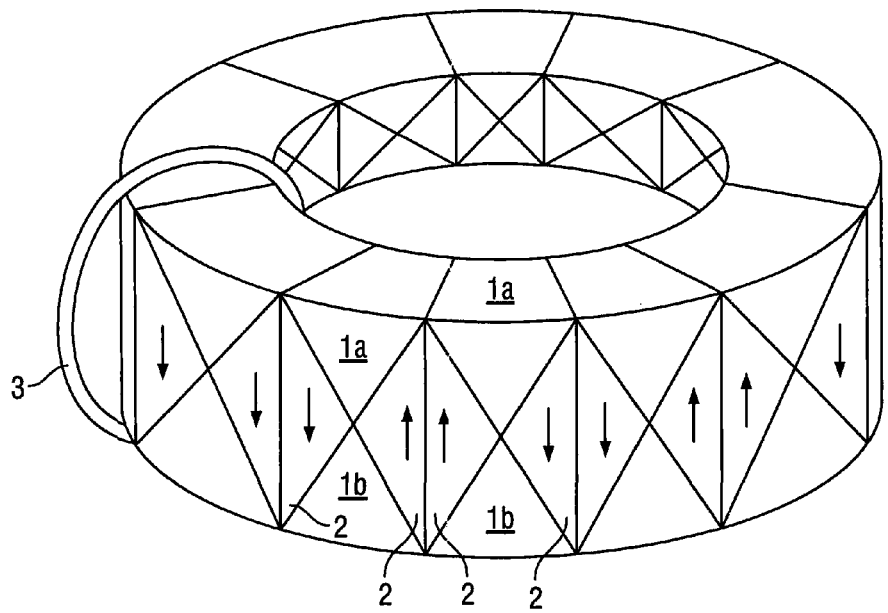
FIGS. 8B and 8C show domain type arrangements having a tapered/mitred joint.
Figure 8C:
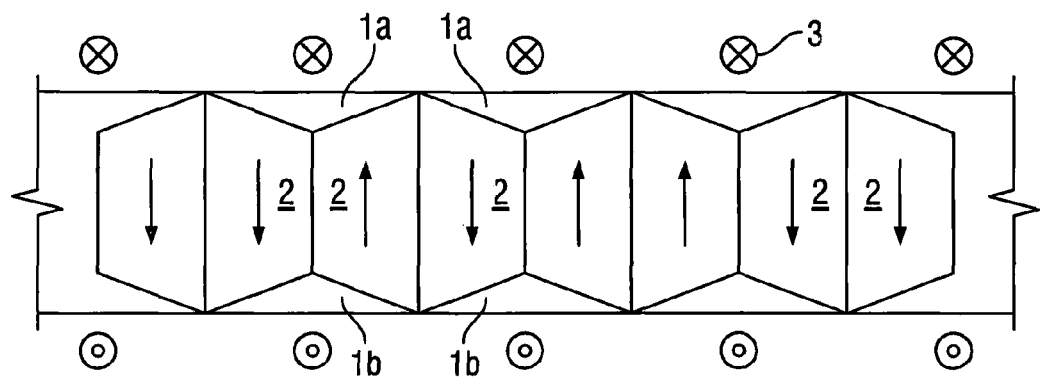

This is taken to an even greater degree in the arrangement of FIG. 8B in which the air gaps 5 of the FIG. 8A embodiment are not present and the arrangement is a 'domain type' structure. Such an arrangement is also shown in FIG. 8C which is a linear representation of a FCL core including tapered/mitred joints between the soft iron core members 1a 1b and the hard ferrite magnets 2. The angle of the taper is chosen such that the soft magnetic parts are substantially saturated by the hard magnetic material, given the respective predetermined values for saturation magnetisation for the soft and hard magnetic materials.

The provision of tapered/mitred joints and stepped pole pieces and recessed core members has technical advantages in that the saturation of the core members 1a 1b is increased. This maximises the effectiveness of the limited mmf of the static mmf magnet sources. It is believed that the use of stepped or tapered/mitred joints between magnets and core members for improvement in FCL performance is novel and inventive per se.

Figure 6:
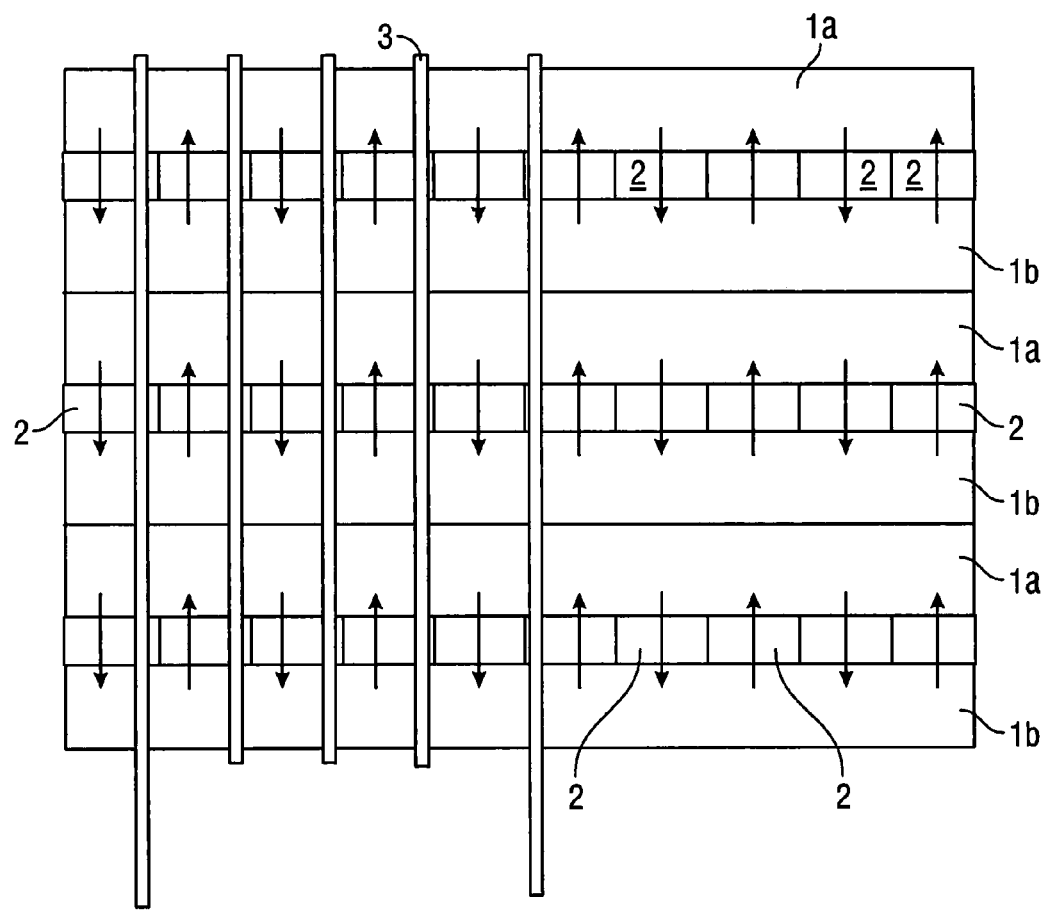
FIG. 6 shows a stacked PMFCL arrangement where multiple rings such as the ring of FIGS. 3 and 4 are stacked one on top of the other.

FIG. 6 shows a stacked PMFCL arrangement where multiple rings such as the ring of FIGS. 3 and 4 are stacked one on top of the other with the AC coil 3 wound around the cores 1 in a parallel arrangement. The arrows in FIG. 6 represent dipole moments of the respective magnets 2. This provides an optimum means of densely packing the cores.

Figure 6A:
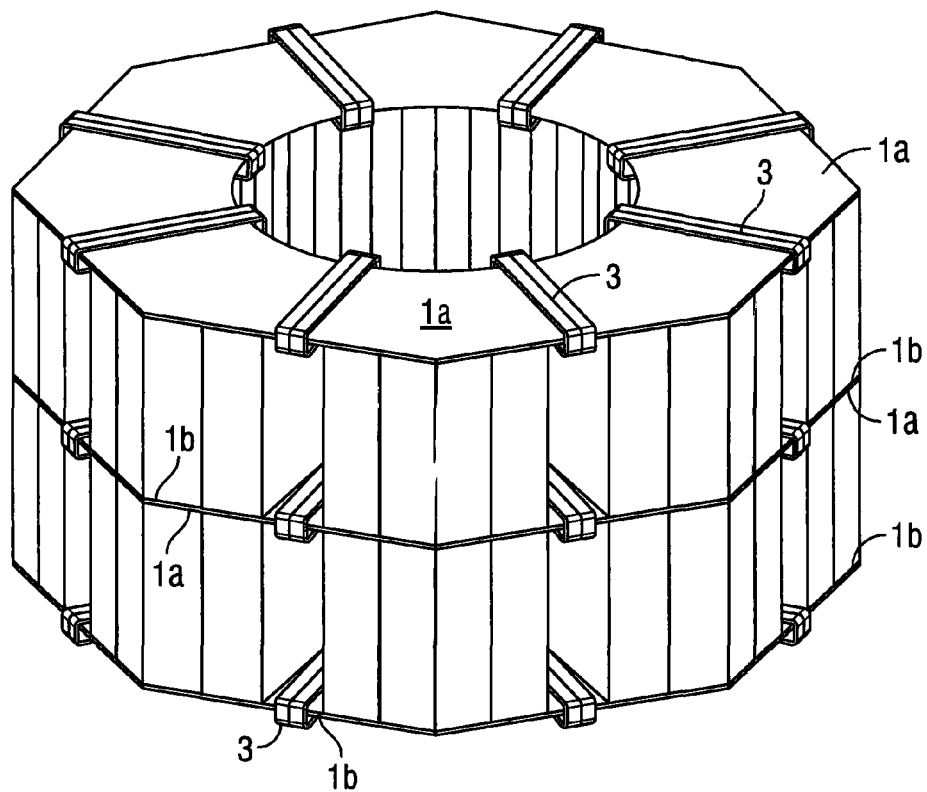
FIG. 6A is an embodiment similar to FIG. 6 showing stacked polygonal core structures.

A corresponding stacked arrangement utilising a regular polygonal ring core (FIG. 4A) is shown in FIG. 6A. This provides the benefits of stacking ring cores with the benefits of utilising a regular polygonal ring core as the basic repeating structure. The cores are stacked one on top of another and the ac windings 3 are either provided around the entire stack or around the core members 1a, 1b, at the position of the air gaps 5 between the magnets 2, as shown in FIG. 6A. Stacking the cores one on top of another, results in a double thickness core member composite at the interface, comprising a core member 1b of an upper core and a second core member 1a of an under-positioned core 1. This has benefits in terms of operational capabilities of a stacked core FCL.

Figure 9:
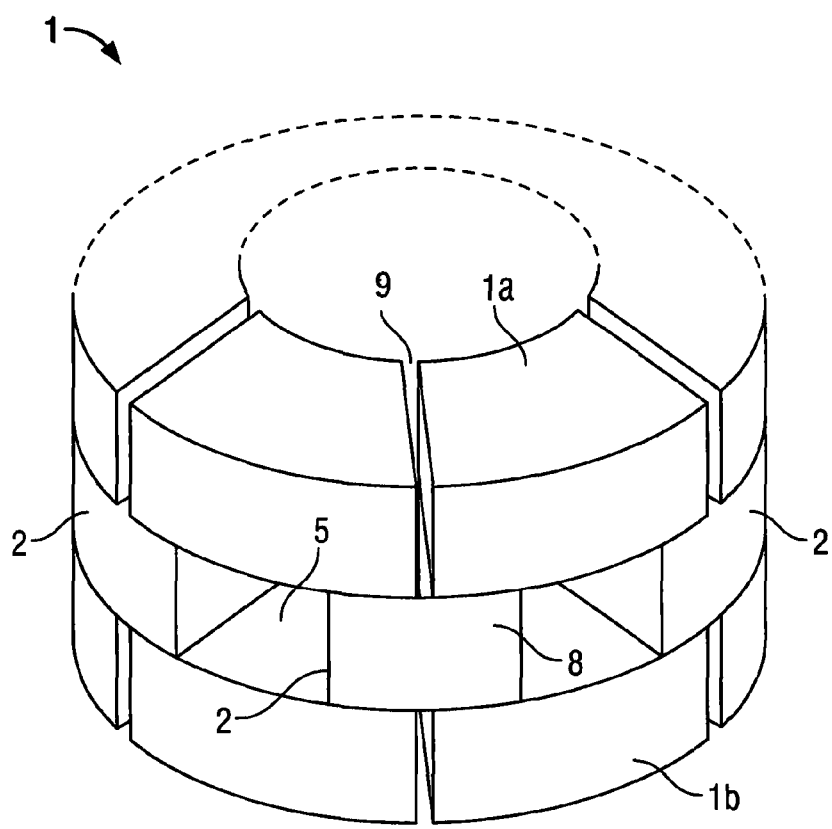
FIG. 9 shows a perspective view of a section of the core and magnets in accordance with a further embodiment of the invention.

FIG. 9 shows the core 1 and magnets 2 of an embodiment of FCL where an air gap 5 is firstly positioned along the circumferential direction so as to provide a space between the adjacent permanent magnets to reduce the DC magnetic flux short circuit, whereby the permanent magnets are arranged between a first and second section of the core. Secondly an air gap 9 is positioned within the first and second (or upper and lower) core members at the mid point above and below each permanent magnet i.e. the mid-point above the pole faces 8 so as to divide a core section 1a, 1b into two further parts. The use of air gaps 9 along the circumferential direction of the soft magnetic core advantageously increases the AC field reluctance of the soft magnetic cores in order to avoid very large AC fields (which are generated by very large fault currents) from driving the core back into saturation which would curtail the current limiting liability of the FCL. It is also important not to increase the DC flux path and this can be achieved by placing the air gaps 9 at the mid-point above and below the pole faces of the permanent magnets at the region of DC bifurcation. This feature has been found to greatly enhance the performance of the device by extending the working fault current limiting range.

Figure 10:
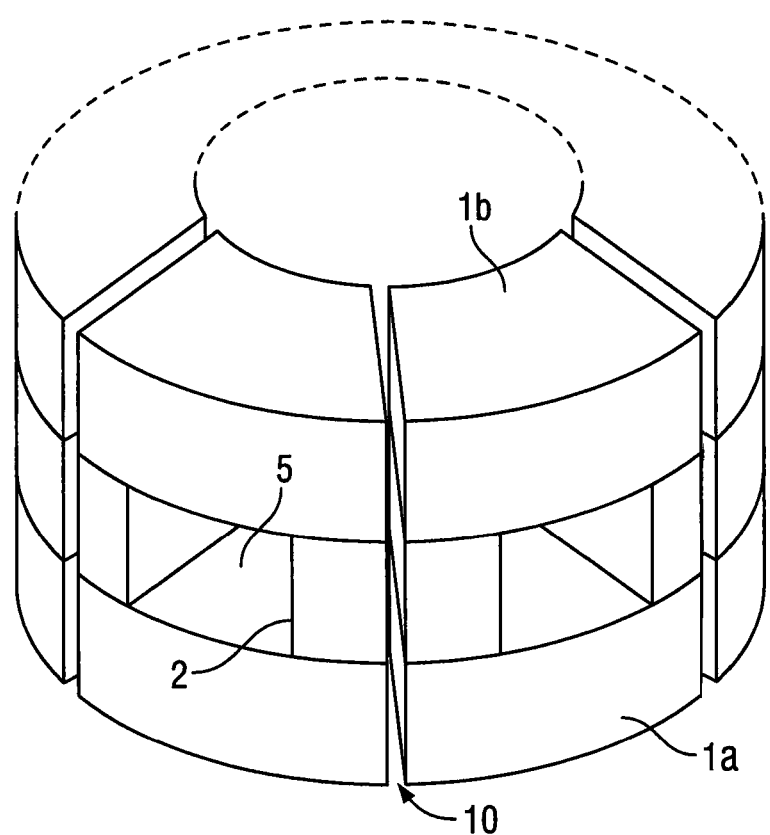
FIG. 10 shows a perspective view of a section of the core and magnets in accordance with a further embodiment of the invention.

FIG. 10 shows the air gap 10 extending through the permanent magnet. This has the advantage of minimising the effect of demagnetisation created by the free poles in FIG. 9 and thus reducing the reluctance in the DC flux path, thereby aiding saturation of the soft magnetic cores in the regions between the magnets and also permits the cores to be constructed in sections so as to aid the manufacturing process.

It will be appreciated that in further embodiments various modifications to the specific arrangements described above and shown in the drawings may be made. For example the permanent magnets can be embedded in a core formed of one single core section, whereby the magnets may be inserted into slots or other forms of recess.

The core member may be formed of strip steel or other ferromagnetic metal alloy, a soft ferrite material or an amorphous or nanocrystalline soft magnetic alloy.

The AC coil may be wound around the core in multiple configurations so as to provide an AC magnetic field which is orthogonal to the magnetic dipole moment of the core, for example when considering the embodiment of FIG. 2, the coil can also be wound around the first core then the second core in a series arrangement or instead the coil may be wound around both the first and second portion in a parallel arrangement described previously. Also the permanent magnets may be positioned at any point between the core arms as long as they form a magnetic circuit in the core preferably with straight or substantially straight limbs extended between the magnets at the corners/vertices. The positioning of the magnet pair may not need to form a symmetrical arrangement. The coil can be wound around each arm pair of the core or only a single arm pair.

Eddy current heating in the electrically conductive permanent magnets may also be prevented by replacing the copper shims with another shielding means. For example the soft iron core itself may be laminated or formed using bonded compacted powders. Samarium Cobalt (SmCo) materials can be selected to give better performance at high temperatures with respect to Neodymium-Iron-Boron based rare earth alloys. Alternatively, when considering the ring arrangement the permanent magnets can be spaced apart by regions of the magnetic core (and not the magnets) and the AC windings can be wound only over the soft magnetic cores so as to reduce eddy currents and to reduce the length of the conductor required in the windings. In a further embodiment the rare earth magnet may not require the use of a shielding means.

Disc, toroidal, polygonal and picture frame core designs have been presented above. Alternative core designs may be used in the present invention. The magnetic material may be in the form of a lamination, film, strip, tape, ribbon, wire or the core may be formed by sintering pressing.

It is clear that other core cross sections are suitable for use in the present invention and may include rectangular, circular, cruciform or cross-shaped, orthogonal and triangular. The shapes of permanent magnet 2 may also be varied. Different profiles may be selected in order to optimise the path of the DC flux in the soft magnetic cores so as to maximise the volume of soft magnetic material which is held at, or near, saturation.

Instead of a stacked arrangement of core members, a chain arrangement comprising a plurality of core elements, each defining a central aperture, the core elements being joined together in order to create a closed magnetic circuit may be applied. The AC coil may be wound around each of the linked arm pairs in a series arrangement. The magnetic material may be in the form of a lamination, film, strip, tape, ribbon or wire or the core may be formed by sintering or pressing.

The permanent magnet need not be made from electrically conducting rare-earth materials which possess a good re-coil capability. Alternatively, hard ferrites which are non-conducting oxides can be selected for the permanent magnet. This is a good alternative because it is considerably cheaper than the high energy rare-earth magnets and removes any need for the shims or plates to be implemented. However the size of the Fault Current Limiter for a given rating where hard ferrites are implemented would be substantially larger than when electrically conducting rare-earth materials which possess a good re-coil capability are implemented.

When considering FIG. 3 it is clear that the permanent magnets may be placed side by side such that the magnets are in contact with each other, however this can provide a lack of DC flux into the soft magnetic core and would require the soft magnetic cores to be thinner in order to get saturation. Therefore by separating the permanent, magnets by air gaps the DC flux follows paths through greater sections of the soft magnetic core. Optimum separation of magnets will depend on magnetic characteristics of soft and permanent magnetic materials and core geometry. The second type of air gap, which has a minimal effect on the DC flux can extend through the soft magnetic core sections only or it may extend through the core sections and the length of the permanent magnet. The second air gap in the soft core need not be present in the FCL arrangement.

When considering FIGS. 9 and 10 it is clear that wider air gaps may be implemented, however modelling has shown that the arrangement of the air gaps as shown in FIGS. 9 and 10 may provide a greater advantage to the avoidance re-saturation by very large fault currents. However, as described previously there may be air gaps within the core positioned at the mid-point of every permanent magnet, or alternatively at the mid-point of just some. The air gaps may or may not all be the same length. The width of the air gaps may be a set value, or could be altered at a later date so as to suit the particular application of the Fault current limiter.

In the previous embodiments the AC coil is generally wound around the complete Fault Current Limiter core depth comprising the soft (the core) and the hard (the permanent magnet) components, however the AC windings can be wound around the soft magnetic core 1 only in the region of the soft magnetic core where the saturation is to be achieved, rather than just in one location or remote from this, or these, regions. This beneficially reduces the total area of the coil and hence the inductance of the coils.

Consideration can be given to the pitch of the winding i.e. the concentration of the winding at different regions of the core for a given number of turns of the coil, (whereby windings are placed closer together in regions that require a stronger magnetic field and windings are spaced apart at larger intervals where a reduced magnetic field strength is desired). The pitch is varied so as to uniformly take out 50% of the core during each half cycle. This variation of the pitch of the winding would also avoid regions of the core which are initially under-saturated thereby minimising the coil inductance under non-fault conditions.

In an alternative embodiment the permanent magnets could be replaced by DC conducting or superconducting coils containing a soft magnetic or an air core. This would provide adjustability of the DC static magnetic flux. The interaction of the AC and DC fluxes are the same as described when selecting permanent magnet configuration. It is also envisaged that a combination of a DC coil and a permanent magnet can be implemented too.

The embodiments of the invention may exist as multilayers of air gapped magnets and cores so as to form discrete sectors i.e. the core is formed from at least two segments which are arranged to form the core as a whole. The sectored, or air gapped core, has constructional benefits enabling a high current winding to be manufactured in sections or segments, whereby piece parts of the core sectors and corresponding coil sectors can be assembled to form the completed toroid structure.

The present invention comprises combinations of features described with respect to different embodiments.

Advantages include that the FCL is always ready as a) it responds equally to each half of the AC cycle and b) the permanent magnets are not easily permanently demagnetised, springing back to their original magnetic condition after a fault current event has occurred. The FCL greatly reduces the use of costly materials compared to the prior art and is also operable over a broad power range in single and three phase alternating power systems such that the FCL can be used in low power, (i.e. more numerous) applications and high power applications. Further, the relative orthogonal arrangement between the DC/static magnetomotive force source and the varying magnetomotive force source protects the permanent magnets and aids saturation of the core material since the DC/static magnetomotive force can be more distributed without increasing the AC reluctance of the core material (since the relative permeability of the permanent magnet material is low and is seen by the AC magnetomotive force as a high reluctance element in the magnetic circuit).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements except when specifically stated as such and vice-versa. The mere fact that certain features are recited in mutually different dependent claims does not indicate that a combination of these features cannot be used to advantage.

The invention claimed is:

1. A fault current limiter (FCL) comprising:
   a core structure in the form of a polygonal shaped ring having connected sides of the polygon, the core structure comprising
   i) a first magnetisable core member, and
   ii) a second magnetisable core member, spaced from the first core member;
   an AC magnetomotive force source configured to generate a varying magnetic flux in at least a portion of the first and second magnetisable core members; and
   a plurality of static magnetomotive force (mmf) sources being positioned to provide a magnetic circuit within at least part of the magnetisable core members,
      wherein each static mmf source has a body, which includes limbs extending in different directions following the shape of the adjacent core member, and
      wherein the static mmf sources are positioned at corners/vertices of the core structure and wherein the limbs extend at inclined angles corresponding to the angle between the connected sides of the polygon.

2. A FCL according to claim 1, wherein the AC magnetomotive force source and the static magnetomotive forces source are relatively positioned to be orthogonal to each other.

3. A FCL according to claim 1, wherein the first core member comprises a first closed magnetic circuit and the second core member comprises a second closed magnetic circuit distinct from the first closed magnetic circuit.

4. A FCL according to claim 1, wherein the first and/or second magnetic circuit are comprised of core members spaced by air gaps.

5. A FCL according to claim 1, wherein the static magnetomotive force sources are positioned to provide magnetic saturation in both of the magnetic circuits.

6. A FCL according to claim 1, wherein the static magnetomotive force sources are positioned to bridge the gap between the first and second core members.

7. A FCL according to claim 1, wherein static magnetomotive force sources are positioned to provide a bifurcated magnetic field in the core adjacent to the static magnetomotive force source in which the field direction in the same core member branches in opposed directions at the junction with the static magnetomotive force source.

8. A FCL according to claim 1, wherein the FCL comprises a plurality of the core structures that are positioned stacked or in file one adjacent another.

9. A FCL according to claim 8, wherein AC windings are wound around the entire stack or file of adjacent ring core structures.

10. A FCL according to claim 8, wherein AC windings are wound around the first and second core members in adjacent core structures.

11. A FCL according to claim 1, wherein the polygonal shaped ring has 6 or more sides.

12. A FCL according to claim 1, wherein the polygonal shaped ring has 8 or more sides.

13. A FCL according to claim 1, wherein the static mmf sources comprise a respective body which extends adjacent the core member for a distance greater than an air gap spacing adjacent static mmf source bodies.

14. A FCL according to claim 1, wherein the static mmf sources comprise a respective body which includes a mitered or tapered jointing surface formation forming a mitered or tapered joint with a complimentarily mitered or tapered jointing surface of the core member.

15. A FCL according to claim 1, wherein the static mmf sources comprise a respective body which includes a stepped jointing surface forming a joint with a complimentarily recessed jointing surface of the core member.

16. A fault current limiter according to claim 1, wherein the AC magnetomotive force source is an AC coil having a longitudinal axis and to which is applied an AC current so as to produce an AC magnetic field.

17. A fault current limiter according to claim 1, wherein the static magnetomotive force source is a magnet having a magnetic dipole moment associated with it.

18. A fault current limiter according to claim 1, wherein the static mmf source comprises a magnet formed from a permanent magnetic material having a default magnetisation.

19. A fault current limiter according to claim 1, wherein the arrangement of the at least one magnet causes at least part of the at least one core member to become magnetically saturated in normal operation.

20. A fault current limiter according to claim 1, wherein in a fault condition the magnitude of the AC magnetic field increases from a normal state value to overcome magnetic saturation in at least part of the at least one core member.

21. A fault current limiter according to claim 16, wherein the AC coil obtains a higher inductance value when a fault condition occurs.

22. A fault current limiter according to claim 16, wherein respective one magnetisable core members responds to the positive and negative halves of the AC current cycle received by the AC coil.

23. A fault current limiter according to claim 1, wherein the magnetisable core contains at least one air gap.

24. A fault current limiter according to claim 1, wherein at least one air gap is arranged between two adjacent permanent magnets so as to space apart the at least two adjacent magnets.

25. A fault current limiter according to claim 1, wherein the at least one air gap in the magnetisable core is positioned to intersect with the pole face of a magnet comprising a static mmf source.

26. A fault current limiter according to claim 1, wherein the static magnetomotive force source is a permanent magnet and the permanent magnet recovers its default magnetised state on cessation of a fault current event.

27. A fault current limiter according to claim 1, wherein the AC magnetomotive force source is an AC coil and the AC coil is wound around the region of the magnetisable core where the overcoming of saturation is to be achieved.

28. A fault current limiter according to claim 27, wherein the AC coil is wound around the outer circumference of the magnetisable core.

29. A fault current limiter according to claim 1, wherein at least one of the first and second magnetisable core members are formed of strip steel or other ferromagnetic metal alloy, a soft ferrite material or an amorphous or nanocrystalline soft magnetic alloy.

30. A circuit including the fault current limiter of claim 1.

31. An alternating current power system including the fault current limiter of claim 1.

32. A fault current limiter according to claim 1, wherein the limbs extend around outer surfaces of corners/vertices of the polygonal ring.

33. A fault current limiter according to claim 32, the limbs extend from the first magnetisable core member to the second magnetisable core member across the space therebetween and wherein the limbs extend a distance greater than the spacing.

* * * * *